Jan. 22, 1952     E. S. GUTTMANN     2,583,371
MEASURING DEVICE
Filed Feb. 31, 1944     4 Sheets-Sheet 1
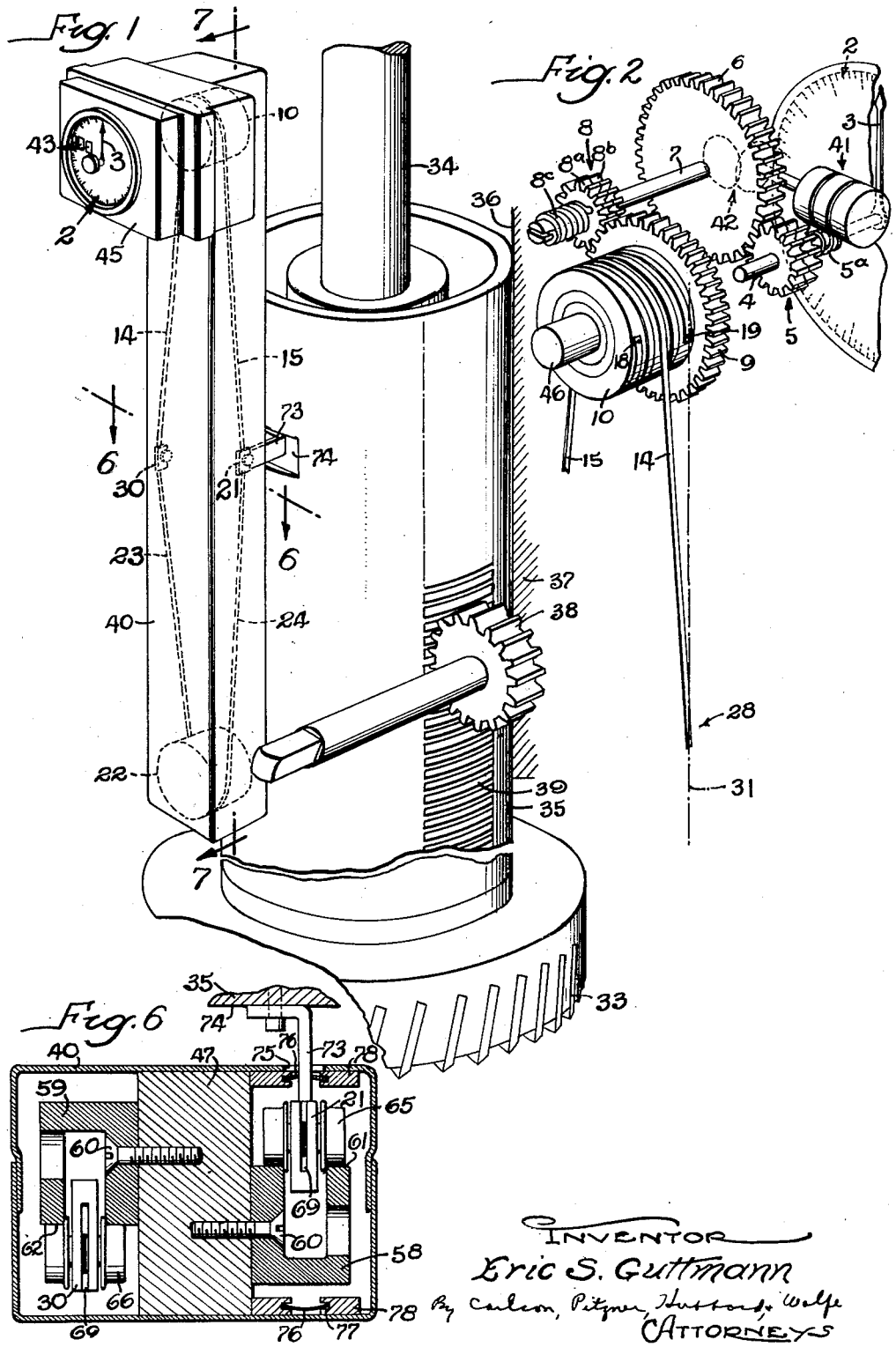
INVENTOR
Eric S. Guttmann
By Carlson, Pitzner, Hubbard, Wolfe
ATTORNEYS Jan. 22, 1952     E. S. GUTTMANN     2,583,371
MEASURING DEVICE
Filed Feb. 31, 1944     4 Sheets-Sheet 2
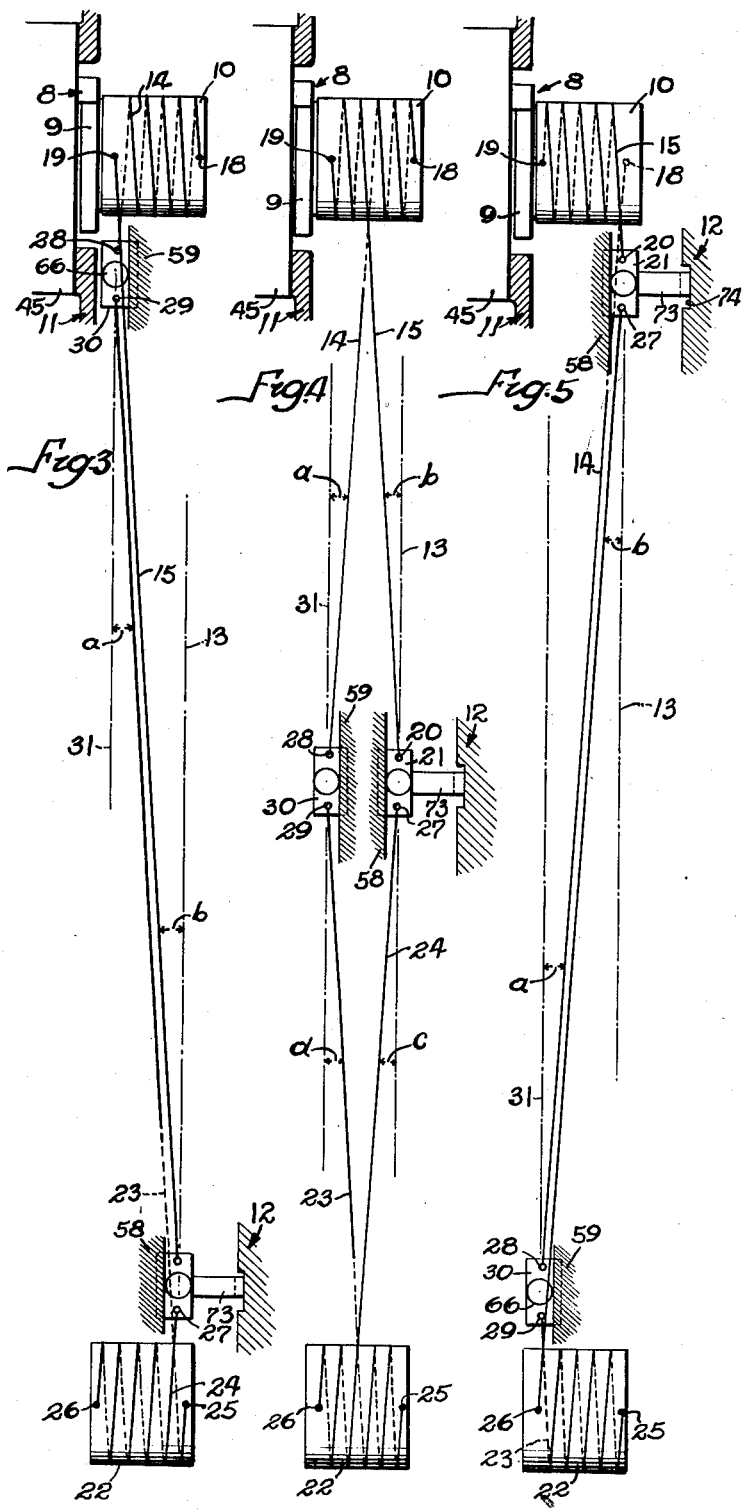

Jan. 22, 1952   E. S. GUTTMANN   2,583,371
MEASURING DEVICE
Filed Feb. 31, 1944   4 Sheets-Sheet 3
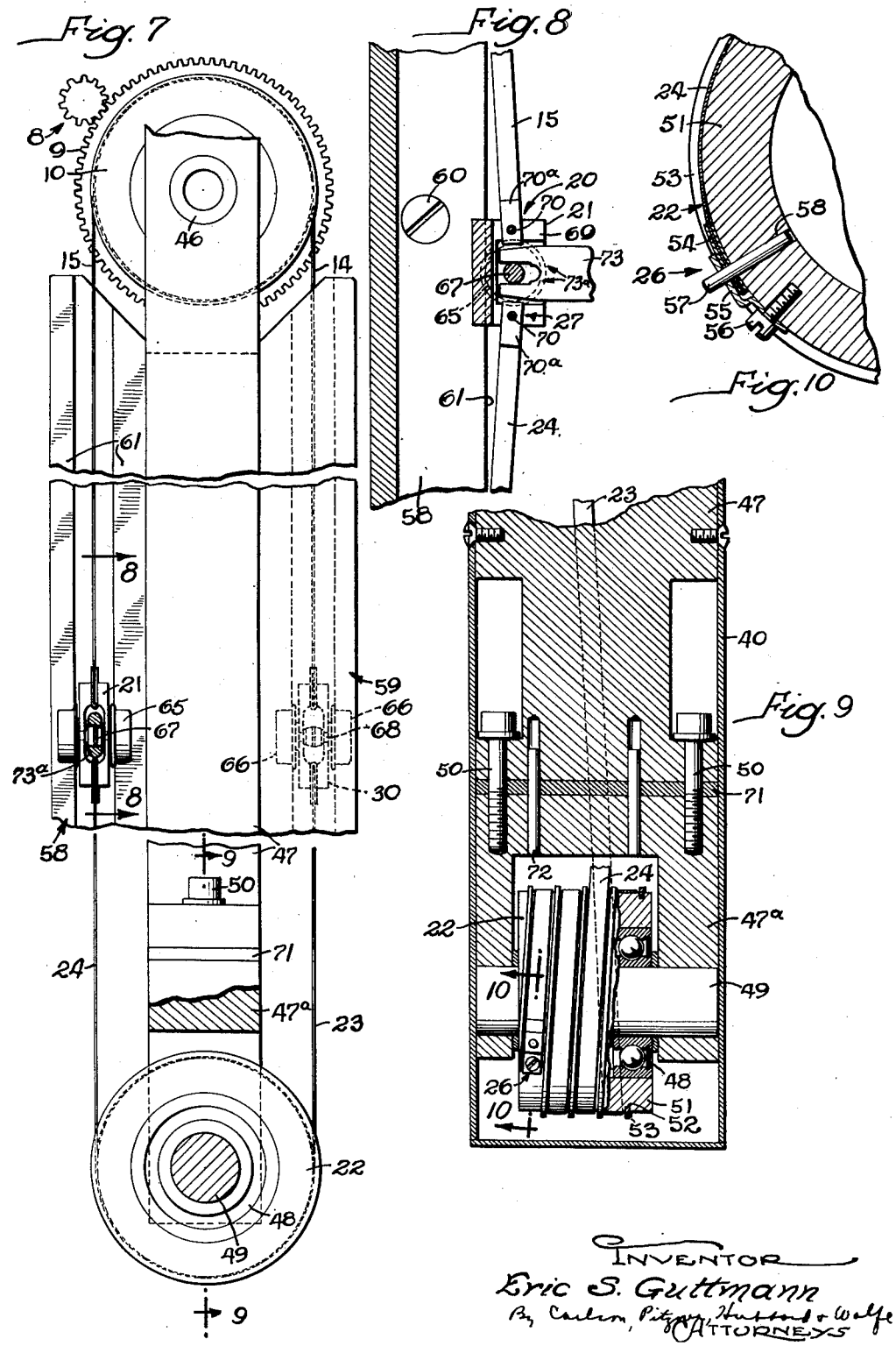
INVENTOR
Eric S. Guttmann
By Carlson, Pitzner, Hubbard & Wolfe
ATTORNEYS Jan. 22, 1952     E. S. GUTTMANN     2,583,371
MEASURING DEVICE
Filed Feb. 31, 1944     4 Sheets-Sheet 4
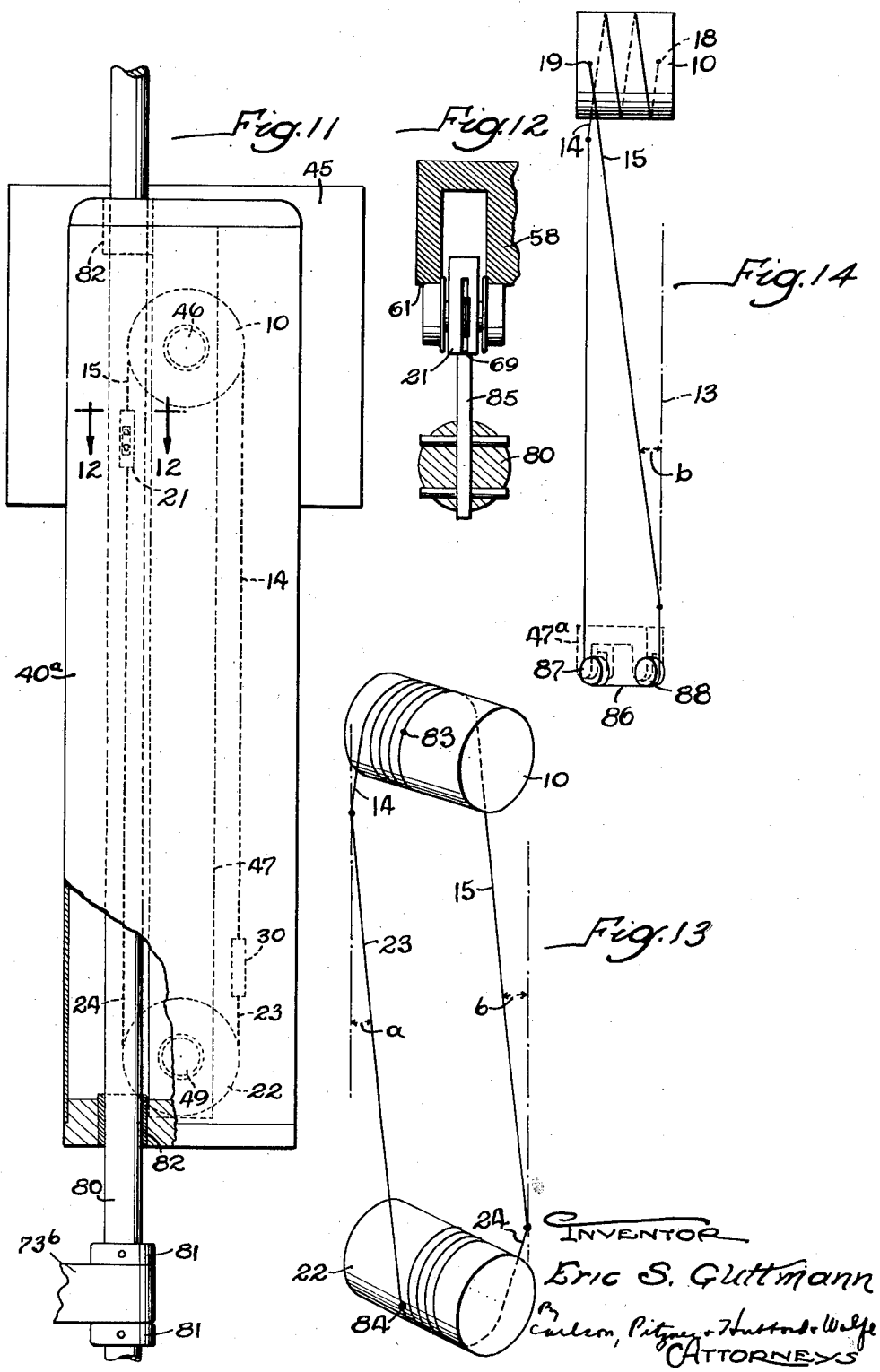
INVENTOR
Eric S. Guttmann
ATTORNEYS Patented Jan. 22, 1952

2,583,371

UNITED STATES PATENT OFFICE 2,583,371

MEASURING DEVICE

Eric S. Guttmann, Huntington, W. Va., assignor to The Ingersoll Milling Machine Company, Rockford, Ill., a corporation of Illinois Application January 31, 1944, Serial No. 520,498

4 Claims. (Cl. 33—125)

The present invention relates to precision devices for measuring the relative displacement between two objects. More particularly, the invention relates to an improvement in measuring devices of the type disclosed in my Patent No. 2,293,732 wherein an indicator or control device is actuated in accordance with the rotation of a drum around which a flexible line is wound helically so as to be wound and unwound in accordance with the relative displacement between the objects in opposite directions.

The primary object of the present invention is to provide for turning of the drum positively in both directions of relative displacement of the objects so as to insure equal precision in measurement irrespective of the direction of the relative motion between the objects.

A more detailed object is to provide a second flexible line for turning the drum positively when the direction of the displacement is such as to necessitate reeling in of the first or primary line by which the drum is actuated.

Another object is to provide a measuring device of the above character embodying a novel arrangement for maintaining constant preloading of the flexible line by which the drum is turned.

A further object is to wind the primary and secondary lines on the drum in a novel manner such as to minimize the width of cross travel of the lines.

Still another object is to provide a novel means for guiding the free end of the flexible line and facilitating its attachment to one of the relatively movable parts.

The invention also aims to provide a novel dustproof enclosure for the flexible lines.

Other objects and advantages of the invention will become apparent from the following detailed description taken in connection with the accompanying drawings, in which Figure 1 is a perspective view illustrating the use of the improved measuring device in measuring the movements of a movable cutter support of a machine tool.

Fig. 2 is a fragmentary perspective view of the main operating parts of the improved measuring device.

Figs. 3, 4, and 5 are diagrammatic views showing the main operating parts in different positions.

Figs. 6 and 7 are transverse and longitudinal sectional views taken substantially along the lines 6—6 and 7—7 of Fig. 1.

Figs. 8 and 9 are, respectively, enlarged detail sectional views taken substantially along the corresponding section lines 8—8 and 9—9 in Fig. 7.

Fig. 10 is an enlarged fragmentary sectional view through one of the tape anchorages on the drum taken substantially along the line 10—10 in Fig. 9.

Fig. 11 is a rear view of a measuring device substantially like that of Fig. 1 but equipped with a modified form of housing and connecting means for applying the same to a machine tool or the like.

Fig. 12 is an enlarged fragmentary detail sectional view taken substantially along the line 12—12 of Fig. 11.

Figs. 13 and 14 show respective modified forms of line and drum arrangements suitable for use in measuring devices generally like that of Fig. 1.

While the invention is susceptible of various modifications and alternative constructions, I have shown in the drawings and will herein describe in detail the preferred embodiments. It is to be understood that I do not thereby intend to limit the invention by such disclosures, but aim to cover all modifications, alternative constructions, and uses falling within the spirit and scope of the invention as expressed in the appended claims.

Generally stated, the improved measuring device includes a drum 10 rotatably mounted on a stationary machine part 11 (Figs. 3 to 5) and adapted to be turned in accordance with the movement of a part 12 along a path 13. Two lengths 14 and 15 of flexible line are wound helically and of uniform pitch around the drum with the unreeled portions of the lines always intersecting the path 13 at angles $a$ and $b$ which are equal to the helix angles of the wound portions of the lines. The arrangement is such that one line is unreeled and the other is reeled in as the part 12 moves in either direction along the path 13. As a result, the line which is being unreeled acts positively to turn the drum and drive the indicating mechanism actuated thereby.

Where, as illustrated in Figs. 3 to 5, the unreeled lengths of the lines 14 and 15 are extended away from the drum in the same direction, the lines are led off from opposite sides of the drum and the end of the line 15 only is attached to the machine part 12 at a point 20 which is on a slide 21 guided for movement back and forth along the path 13. Thus, the line 15 operates to turn the drum positively when this line is being unreeled by movement of the part 12 away from the drum. To provide for positive unwinding of the other line 14 when the part 12 is moving in the opposite direction or toward the drum, a second drum 22 of the same size and construction as the first drum 10 is mounted on the stationary machine part 11 and spaced from the drum 10 somewhat farther than the operating range of the movable part. Two auxiliary lines 23 and 24 are wound on the drum 22 with their ends attached at spaced anchorage points 25 and 26 with their unreeled lengths extending from opposite sides of the drum and toward the drum 10 at angles $c$ and $d$ which are equal to the angles $a$ and $b$ and the helix angles of the wound portions of the lines 23 and 24. The free end of the line 24 is connected at 27 to the slide 21 and therefore to the free end of the line 15. The free ends of the lines 14 and 23 are attached at points 28 and 29 to a slide 30 which is guided for movement along a path 31 paralleling the path 13.

With this arrangement, the lines 23 and 24 are reeled in and out relative to their supporting drum 22 and transmit the motion of the movable part 12 positively to the line 14 so that the latter turns the drum 10 positively when the movable part 12 is moving toward the latter drum. Thus, as the part 12 moves from the Fig. 5 position to the Fig. 4 position, the lines 15 and 23 fully wound on the drums 10 and 22 are unreeled while the lines 14 and 24 are partially wound onto the drums. Such reeling out of the lines 15 and 23 and reeling in of the lines 14 and 24 continues as the part 12 moves to the position shown in Fig. 3, the lines 15 and 23 then being fully unwound. In the reverse motion of the part 12 toward the drum 10, the reeling and unreeling is reversed, and the motion of the part is transmitted positively to the line 14 through the intermediary of the line 24, the drum 22 and the line 23.

The invention as illustrated in Figs. 3 to 5 is shown in Figs. 1, 2, and 6 to 10 incorporated in a machine tool assembly and arranged to afford a continuous and accurate indication of the displacement of a milling cutter 33 carried by a spindle 34. The latter rotates in a quill 35 which constitutes the movable machine part above referred to and is splined for vertical movement along a guideway 36 on a housing 37. By turning a pinion 38 meshing with rack teeth 39 on the quill 35, the latter may be fed endwise.

For this application, the drums 10 and 22 are mounted within the upper and lower ends of a tubular sheet metal casing 40 of generally square cross section mounted rigidly adjacent the quill 35 on a stationary part such as the frame of the machine tool above referred to as part 11. Through suitable anti-friction bearings (not shown), this drum is carried by a shaft 46 which is supported at opposite ends in the yoke shaped upper end of a bar 47 (Figs. 6, 7, and 9). Reference may be made to the aforesaid patent for further details of the drum mounting and of the manner of effecting initial adjustment of the mounting to compensate for manufacturing inaccuracies in the size of the drum periphery.

The lower drum 22 is similarly supported through anti-friction bearings 48 (Fig. 9) by a shaft 49 fixed in the yoke-shaped lower end of a member 47ª secured to the member 47 by cap screws 50. As in the case of the drum 10, the drum 22 comprises a sleeve 51 (Fig. 9) having an accurately ground cylindrical periphery with a helical groove 52 therein receiving a coiled spring 53 of rectangular cross-section. This spring defines the side walls of an annular groove on the periphery of the drum, the root of the groove being defined by the periphery of the sleeve 51 itself for receiving the flexible lines 23 and 24. The latter and also the lines 14 and 15 are preferably made in the form of thin, flat steel tapes or ribbons approximately .006 of an inch thick and $\tfrac{3}{16}$" wide.

A suitable form of anchorage for connecting the ends of the tapes to their respective drums is detailed in Fig. 10, the anchorage 26 for the tape 24 there shown being identical with that used at the points 18, 19 and 25 previously referred to. About the end of the tape 24 is doubled a reenforcing strip 54 underlying a clamp strip 55 secured to the drum by a screw 56. A dowel 57 passing through registering holes in the clamp strip and tape enters a hole 58 in the drum and retains the end of the tape firmly and accurately in position.

To guide the slides 21 and 30 along the paths 13 and 31 which parallel the quill guideway, tracks or ways are arranged within the housing 40. Herein (see Figs. 6, 7 and 8) these comprise channels 58, 59 fixed by screws 60 to opposite sides of the bar 47. The channels present accurately ground pairs of flat guide surfaces 61 and 62 which face in opposite directions (see Fig. 6). The slides 21 and 30 comprise rectangular blocks mounted on flanged rollers 65, 66 which are journaled on cross pins 67, 68. The slides have longitudinal slots 69 therein for reception of the tape ends. As best shown in Fig. 8, reenforcing strips 79ª are doubled about the ends of the tapes and transverse pins 70 (Fig. 8) fixed in the car bodies pass through the reenforced ends of the tapes securing them to the slide bodies to form the anchorage points 20, 27, 28 and 29 previously referred to.

Tension in the tapes themselves serves advantageously to hold the slides or cars 21, 30 in firm running contact with the guide surfaces 61 and 62. This is because, as shown in Figs. 1, 4, and 8, the portions of each of the pair of tapes secured to one of the slides approaches the latter at equal but opposite angles so that the tension on the tapes produces force components that are directed toward the slide guideways and serve to hold the rollers 65, 66 against the guides at all times. Any possibility of inaccuracy in operating of the instrument due to the slides being displaced from their guides is eliminated. As a matter of fact, it is unnecessary to provide flanges on the rollers except for simplicity in assembly.

It is to facilitate preloading or initial tensioning of the tapes that the supports 47 and 47ª are made structurally separate. By inserting one or more shims 71 (Fig. 9) between their abutting faces, the supports 47, 47ª are forced apart sufficiently to subject the tapes to a determinate minimum tension which is maintained throughout the life of the instrument. Dowels 72 serve to align the parts 47, 47ª accurately. With the tapes or other flexible lines thus maintained under substantial tension, although safely below their elastic limit, by the preloading described, possibility of inaccuracy in the instrument due to sagging or sway of the tapes is eliminated.

Connection of the slide 21 to the quill 35 or other relatively movable member to which it is to be attached (see Figs. 1, 2 and 8) is accomplished by a laterally projecting bracket 73 secured to a flat 74 machined on the side of the quill and having a forked outer end 73ª in which the pin 67 fits closely so as to avoid any lost motion in the connection. The bracket 73 projects through a longitudinal slot 75 (Fig. 6) in the rear wall of the casing 40, this slot being sealed against the entry of dirt or other foreign matter by an endless steel tape 76. The bracket 73 projects through and snugly fits within a single aperture in this tape 76, the latter being otherwise uninterrupted. The edges of the tape 76 are received in continuous guide slots 77 fashioned in strips 78 secured to the inner walls of the casing 40 and forming a continuous track for the tape. By making the tape 76 of resilient material and dimensioning it with a slightly greater width than the spacing between the roots of the slots 77, it is bowed laterally and outwardly to press resiliently against the slot edges in good sealing contact therewith.

At the upper end of the casing 40 (see Fig. 1) is fixed a laterally projecting auxiliary casing 45 of box-like form which houses the indicator mechanism that is driven in accordance with the rotation of the drum 10. As shown in Fig. 2, a gear 9 is fixed to the end of the drum 10 to revolve therewith and meshes with a pinion 8 carried by a shaft 7. In order to take up backlash between the pinion and the gear, the pinion is split into two complemental sections $8^a$ and $8^b$. The section $8^b$ is fixed to the shaft 7 while the section $8^a$ is loose thereon, being yieldably urged to turn in a counterclockwise direction by a torsion spring $8^c$ anchored at its respective ends to the shaft 7 and to the pinion section $8^a$. With such an arrangement, tight contact is always maintained between the faces of the teeth of the gear 9 and pinion 8 irrespective of direction of rotation. Also fixed on the shaft 7 is a gear 6 meshing with a pinion 5 on shaft 4 which carries an indicator needle 3 for dial 2. The pinion 5 is also constructed in two sections like the pinion 8, one being fixed to the shaft 4 and the other yieldably connected to such shaft by a torsion spring $5^a$ so that backlash between the pinion 5 and gear 6 is also prevented. A wheel type revolution counter 41 is driven through bevel gears 42 from the shaft 7. Since this counter affords the coarser part of the reading, precaution against backlash in its drive is not requisite. The numerals or other indicia on the peripheries of the wheels of the counter are exposed through suitable apertures 43 in the face of the dial 2 (Fig. 1) so as to be associated closely with the dial scale.

By suitable calibration, choice of drum diameter and gear ratios in the indicator drive, the indicator can be set up to read directly in any units of measure desired. In the particular application of the instrument shown in Fig. 1, and in which the movement of the milling machine quill 35 is being measured, the indicator could desirably be arranged so that inches and tenths thereof are registered by the wheel type counter 41 and thousandths of an inch registered by the needle 3 against the scale on the dial 2, the total registration for one full revolution of the needle being $\frac{1}{10}$ of an inch and the graduations being in thousandths.

The construction shown in Fig. 1 and described above affords a self-contained unit type of instrument that may be readily applied in a great variety of installations. In mounting it on a milling machine, for example, to measure the displacement of the quill 35 as indicated in Fig. 1, it is necessary to make no alteration in the machine tool itself except to provide a flat mounting surface on the head from which the quill projects, such surface being made substantially parallel to the path of travel of the quill. Having made these preparations, the casing 40 is fixed to the mounting surface and the bracket 73 is hooked on to the slide 21. Thereupon the instrument is ready for operation and will afford a continuous and precise indication of the movement of the quill. The positive drive of the drum 10 by the preloaded tapes as previously described assures maintenance of accuracy throughout the service life of the instrument. Not only does the self-contained unit character of the device simplify its mounting and removal, but the arrangement is also such, as heretofore described, to maintain it sealed against the entry of dirt or other foreign matter even when used in a shop installation where the processes carried on are such that there is of necessity every likelihood of dirt and chips falling on the instrument.

In Fig. 11 is shown a modified form of unit housing and connecting arrangement. The interior arrangement of the tapes, drums and indicator parts may, for example, be like that shown in Fig. 1, and accordingly the same reference numerals have been used to indicate corresponding parts. In this instance the housing, designated as $40^a$, corresponds to the housing 40 of Fig. 1 and is generally like it except that the slot 75 in the rear wall, and of course its sealing arrangement, have been omitted. In lieu of a bracket projecting through such a slot to afford connection to the slide 21, there is in this instance a rod 80 extending longitudinally through the housing $40^a$ having collars 81 pinned to its lower portion and clamping between them a bracket $73^b$ which may be attached to one of the relatively movable members whose displacement is to be measured. The drum supporting housing $40^a$ is attached to the other of the pair of such members. The rod 80 is slidable endwise within accurately machined bushings 82 fixed in the top and bottom walls of the housing $40^a$. In this way, the interior of the housing is effectively sealed against the entry of dirt or other foreign matter.

The connection between the rod 80 to the slide 21 is shown in Fig. 12. A laterally projecting arm 85 rigidly pinned to the rod 80 is fixed at its outer end to the slide 21, preferably by providing a bifurcated end on the arm 85 adapted to embrace the pin 68 just as in the case of the bracket 73 shown in Fig. 8.

Rather than utilizing four separate lengths of tape as in Figs. 1, 2, and 3 to 12, the four portions of tape requisite for such an installation may be afforded by using but two pieces of tape anchored at 83 and 84 intermediate their ends to the respective drums 10 and 22 with their end portions 14, 15, 23 and 24 wrapped helically around opposite end portions of the drum. Such an arrangement is shown diagrammatically in Fig. 13 from which it will be observed that the drums 10 and 22 must be of greater lengths than with the preferred arrangement previously described.

If desired, the construction of the instrument of Fig. 1 may also be modified by using a form of tape guide other than a second drum in order to turn the drum 10 positively when the movable part 12 is moving toward the latter. As is diagrammatically shown in Fig. 14, the ends of the portions of tape 14 and 15 may be interconnected by a single length of tape 86 led over simple roller guides 87 and 88 rotatably supported on the lower end $47^a$ of the bar 47. These rollers are of course positioned to provide the same angles $a$ and $b$ between the tapes 14 and 15 and the paths of travel of the movable machine part as in the form of the invention previously described, these angles being the helix angles of the wound portions of the tape. It is possible to use the somewhat simpler arrangement diagrammed in Fig. 14 in view of the fact that the slides 21 and 30 must of necessity have rectilinear motions in their respective fixed paths. With the tape or flexible line layout shown in Fig. 14, the angling of the unreeled portions of lines 14 and 15 is such as to react on the slides 21 and 30 to maintain them in contact with their associated guide surfaces.

It will be apparent from the foregoing that the improved measuring instrument is ruggedly constructed to withstand sudden and severe stresses that may be encountered for example in its use on a machine tool and yet measure the displacement of a movable part with extreme precision under widely varying temperature conditions that may be encountered. These advantages are obtained by the provision for positively driving the drum 10 in both directions thereby avoiding the necessity of spring or motor wind up devices. The tapes are preloaded uniformly so that the two drums and the connecting tapes constitute self-contained motion transmitting systems all parts of which remain in corresponding positions. Thus, there is no possibility of any looseness in the connections in spite of wide temperature variations. Precisely identical readings will be indicated when the movable machine part moves to a given position in opposite directions. In the preferred forms, the tapes 14 and 15 are so wound on the drum as to minimize the lateral travel of the tapes in winding and unwinding thereby contributing to the compactness of the instrument and the ease with which it may be adapted to various installations. With the tapes thus wound, substantially the entire surface of the drum 10 is covered at all times by the tapes, and the possibility of any foreign material settling on this surface and causing a resulting error in measurement is virtually eliminated.

I claim as my invention:

1. Measuring apparatus having, in combination, two drums rotatably mounted to turn about spaced parallel axes, first and second flexible lines fastened at axially spaced points to one of said drums and helically wound in opposite directions therearound with the free ends extending off from the drum in the same general direction but on opposite sides of the drum, third and fourth flexible lines similarly wound around said second drum with their free ends respectively connected to said first mentioned free ends, and a measuring device actuated in accordance with the angular displacement of one of said drums.

2. Measuring apparatus having, in combination, a drum rotatably mounted, a measuring device actuated in accordance with the angular displacement of said drum and operable to indicate the extent of such displacement, two flexible lines helically wound on said drum with their free end portions extending off from the drum in the same general direction but from opposite sides of the drum periphery, a rotary member spaced a fixed distance from said drum, flexible line means extending around said member and having opposite ends projecting toward said drum and respectively connected to said free end portions, said last mentioned line means transmitting the pull on one of said first lines positively to the other of the first lines, and separate guide means acting at said points of connection to guide the latter in parallel paths laterally spaced apart to incline said end portions relative to said paths at the helix angle of said wound lines.

3. In an apparatus of the character indicated, the combination of a pair of slides movable in laterally spaced parallel paths, a drum revolubly mounted to turn on an axis extending transversely of said paths and having two portions of flexible line anchored thereto and helically wrapped thereabout for unreeling of one as the other is reeled in and vice versa, the unreeled ends of said portions of line being connected to respective slides, a second rotatable drum spaced from said first drum and having two portions of flexible line anchored thereto and helically wrapped thereabout for unreeling of one as the other is reeled in and vice versa, and means connecting the unreeled ends of the last-mentioned portions of line to respective ones of said slides to complete an endless system interconnecting said slides for motion thereof in unison but in opposite directions, said slide paths being laterally spaced apart to incline each unreeled line portion at the helix angle of the wound line in all angular positions of said drums.

4. An instrument for measuring the movement of a member back and forth along a predetermined path comprising, in combination, two drums rotatably mounted to turn about spaced axes extending transversely of said path, first and second flexible lines anchored at axially spaced points to one of said drums and helically wound in opposite directions therearound with the free ends of the line extending off from the drum at adjacent points but on opposite sides thereof and toward said other drum, said free ends being oppositely inclined relative to said path but at constant angles relative thereto equal to the helix angles of the wound portions of the lines, third and fourth flexible lines similarly wound around said second drum with their free ends extending toward said first mentioned free ends, means connecting the free end of the line on one end of the first drum to the free end of the line on the other end of the second drum, means similarly connecting the free ends of the other two lines, means guiding the connections between the lines of the different pairs along separate paths paralleling said first mentioned path and laterally spaced relative thereto to incline each of said lines at an angle relative to said path equal to the helix angle of the wound portion of the line, and a device actuated in accordance with the angular displacement of one of said drums and operable to indicate the displacement of said movable member along said first mentioned path.

ERIC S. GUTTMANN.

REFERENCES CITED

The following references are of record in the file of this patent:

UNITED STATES PATENTS

| Number | Name | Date |
|---|---|---|
| 819,243 | Mothes | May 1, 1906 |
| 1,111,101 | Sawyer | Sept. 22, 1914 |
| 1,305,631 | Travell | June 3, 1919 |
| 1,664,833 | Schaper | Apr. 3, 1928 |
| 2,276,302 | Guttmann | Mar. 17, 1942 |
| 2,293,732 | Guttmann | Aug. 25, 1942 |
| 2,293,733 | Guttmann | Aug. 25, 1942 |

FOREIGN PATENTS

| Number | Country | Date |
|---|---|---|
| 277,345 | Germany | Aug. 10, 1914 |
| 321,641 | Italy | Oct. 11, 1934 |